United States Patent [19]
Shimek et al.

[11] Patent Number: 5,263,471
[45] Date of Patent: Nov. 23, 1993

[54] SOLID FUEL CLEAN BURNING ZERO CLEARANCE FIREPLACE

[76] Inventors: Ronald J. Shimek; Daniel C. Shimek; James F. Wolf, all of 6665 W. Hwy., 13, Savage, Minn. 55378

[21] Appl. No.: 817,081
[22] Filed: Jan. 6, 1992
[51] Int. Cl.$^5$ ............................................. F24D 1/188
[52] U.S. Cl. ..................................... 126/528; 126/77; 126/193; 126/531; 126/547
[58] Field of Search ............... 126/193, 528, 529, 530, 126/531, 547, 548, 77

[56] References Cited

U.S. PATENT DOCUMENTS

| | | | |
|---|---|---|---|
| 4,180,051 | 12/1979 | Maier et al. | 126/502 |
| 4,658,801 | 4/1987 | Black | 126/77 |
| 4,665,889 | 5/1987 | Rumens et al. | 126/77 |
| 4,766,876 | 8/1988 | Henry et al. | 126/193 |
| 4,854,298 | 8/1989 | Craver | 126/77 |
| 4,941,451 | 7/1990 | Gilham | 126/77 |

*Primary Examiner*—Carroll B. Dority
*Attorney, Agent, or Firm*—John B. Sowell

[57] ABSTRACT

A high efficiency clean burning fireplace for burning solid fuels at pyrolytic temperatures is provided with refractory walls maintained about 1100° Fahrenheit at different burning rates. A top wall of the combustion chamber includes an exhaust stack and a primary air heat exchanger having an exhaust manifold for discharging primary preheated combustion air down and across the inside surface of glass panels in the doors of the fireplace. A secondary air heat exchanger is mounted below the primary air heat exchanger and separated therefrom by a top refractory panel in the combustion chamber. The secondary air heat exchanger exhaust manifold is in the combustion chamber and discharges secondary combustion air across the top of the combustion chamber and into the primary combustion air creating a high turbulence and complete burning of the secondary production of combustion while heating the refractory walls above a pyrolytic temperature at different burning rates.

19 Claims, 3 Drawing Sheets

SOLID FUEL CLEAN BURNING ZERO CLEARANCE FIREPLACE

RELATED APPLICATIONS AND INVENTIONS

This application is related to our U.S. Pat. No. 4,793,322 issued 27 Dec. 1988 for a "Direct-Vented Gas Fireplace" and our U.S. Pat. No. 5,016,609 issued May 21, 1991 for "A Direct-Vented Multi-glass Side Fireplace."

BACKGROUND OF THE INVENTION

1. Field of the Invention

The present invention relates to fireplaces used for clean burning solid fuels. More particularly, the present invention relates to a novel zero clearance fireplace which automatically clean burns solid fuels such as wood at different rates of combustion using a novel primary and a novel secondary combustion air system to maintain pyrolytic temperatures.

2. Description of the Prior Art

In our U.S. Pat. No. 4,793,322 a zero clearance fireplace is shown and described which has a highly efficient heat exchanger combined with a gas burner system that meets all of the American National Standard Institute's specifications for gas appliances in ANSI Specification Z21.50 and Z21.60. These specifications have been adapted by the American Gas Association (AGA) design certification standards group for direct vented multi-glass fireplaces. In our U.S. Pat. No. 5,016,609 there is shown and described a direct vented zero clearance fireplace to be used with gas burning systems. This gas burning fireplace was designed for high BTU output and for use with multi-glass side walls and yet produce high efficiency with low carbon monoxide meeting all of the requirements of the ANSI and AGA specifications.

The two above mentioned patents relate to clean burning high efficiency gas heating systems. The latest Clean Air Act mandates pollution standards for wood burning fireplaces and stoves. In addition to the Federal Clean Air Standards that become more stringent and difficult to meet over a period of years, state and local codes have become, and are becoming, even tighter and more stringent than the federal law which is now defined in the Safety and Environmental Standards as set forth in EPA Phase II, 1990. In many western and midwestern cities such as Fresno, Calif., Reno, Nev., Denver, Colo. and numerous other local communities there have been promulgated standards that cannot be met by all existing wood burning zero clearance fireplaces and most wood burning stoves. The owners of such fireplaces and stoves are faced with the possibility of having such fireplaces and stoves replaced or their use discontinued.

Therefore it would be extremely desirable to provide a novel high efficiency clean burning zero clearance fireplace for solid fuels which would meet all of the above mentioned standards.

SUMMARY OF THE INVENTION

It is a primary object of the present invention to provide a solid fuel clean burning zero clearance fireplace.

It is another principal object of the present invention to provide a high efficiency clean burning solid fuel fireplace which adjusts for different rates of combustion.

It is another principal object of the present invention to provide a solid fuel clean burning zero clearance fireplace having a novel primary and secondary combustion air system for maintaining pyrolytic temperatures in the fireplace.

It is another principal object of the present invention to provide a fireplace which maintains high heat at different burning rates so as to burn all of the gas, oil, tars and other volatile elements of solid fuels so as to leave only noncombustible residues.

It is another principal object of the present invention to provide a highly efficient solid fuel clean burning fireplace which maintains a delicate balance of time, temperature and turbulence so as to create a highly efficient clean burning fireplace for solid fuels.

It is another principal object of the present invention to provide a solid fuel clean burning fireplace which maintains pyrolytic temperatures in the combustion chamber and yet maintains a novel air wash over the ceramic glass doors so as to prevent the glass in the doors from being damaged or excess heat being transferred to the doors and frames.

It is another principal object of the present invention to provide a novel primary and secondary combustion air system which requires no fan or forced air system to maintain high efficiency at different burning rates.

It is another object of the present invention to provide a novel primary and secondary combustion air system which delivers air at the top of the combustion chamber.

It is another object of the present invention to provide a manual control setting for different clean burning rates.

It is yet another object of the present invention to provide a system which automatically changes the amount of primary air relative to secondary air when the rate of combustion is changed.

It is another primary object of the present invention to provide a clean burning fireplace for solid fuels which meets the Jul. 1, 1990 EPA Phase II standards for wood burning stoves which sets forth limits of particulate matter emissions for four different burn rates.

It is another principal object of the present invention to meet and surpass EPA Phase II requirements for wood stoves in a wood burning fireplace which will burn wood at variable burn rates which meet all of the EPA Phase II requirements for particulate matter emission.

According to these and other objects of the present invention, there is provided a clean burning high temperature fireplace for burning solid fuels which includes inside of the top of the combustion chamber a primary combustion air heat exchange manifold for supplying primary combustion air down across the inside face of the glass doors or panels in front of the combustion chamber and a heat exchanger duct system for supplying secondary combustion air which terminates in a heat exchange manifold in the top of the combustion chamber below the top panel of the combustion chamber for supplying secondary combustion air across the combustion chamber into the primary air and to the burning solid fuel products of combustion in the combustion chamber whereby a very high heat of combustion is maintained in said combustion chamber when burning solid fuels such as wood at different rates of combustion.

DESCRIPTION OF THE PREFERRED EMBODIMENT

Figure 1:
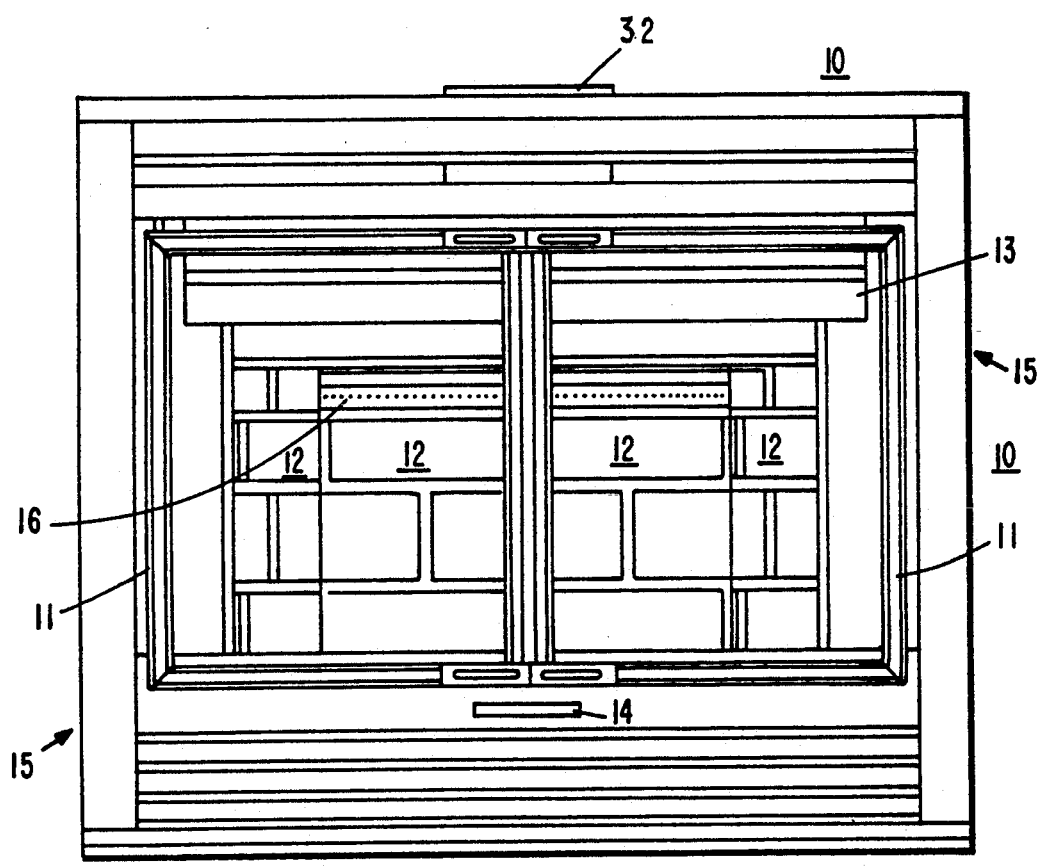
FIG. 1 is a front view in elevation of a preferred embodiment clean burning wood fireplace of the present invention.

Refer now to FIG. 1 showing a clean burning zero clearance fireplace 10 for burning solid fuels such as wood. The novel fireplace 10 is provided with front glass doors 11 having high temperature ceramic glass and forming a front side wall of the combustion chamber which is lined with high temperature refractory material 12 at the bottom, side and top walls as will be explained hereinafter to maintain a high combustion temperature at different burning rates. Behind the glass of doors 11, there is shown an outlet grill or panel 13 which comprises the outlet for the source of primary combustion air which is supplied into the combustion chamber and directed along the inside surface of the glass in the ceramic glass panel doors 11. Further, there is shown a secondary combustion air inlet 14 formed in the frame or grill 15 which surrounds the face of the glass doors 11. The outlet manifold 16 for the secondary air supply is shown having apertures therein for directing the secondary combustion air. The secondary air enters the inlet 14 and is preheated before being supplied to the products of combustion formed when burning the solid fuel with the primary combustion air.

Figure 2:
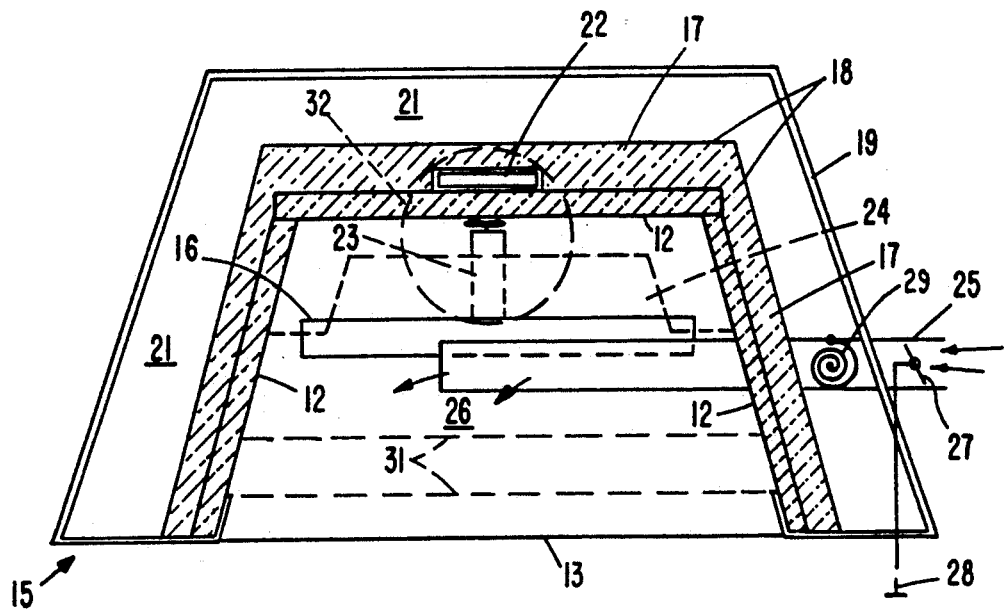
FIG. 2 is a sectional top view of the fireplace of FIG. 1 showing the preferred location of the primary and secondary air manifold supply systems.

Refer now to FIG. 2 showing a top view in section looking down inside the fireplace of FIG. 1. The rigid refractory panels 12 are shown backed by flexible ceramic wool panels 17 which are commercially available in different temperature ratings. In the preferred embodiment of the present invention wherein the refractory panels 12 are operated at temperatures approximating 1500° Fahrenheit, a temperature specified ceramic wool panel of 1400° or greater is preferred. An outer sheet metal panel 18 surrounds the backside of the ceramic wool panel 17. Separated from the sheet metal 18, there is provided an outer surround 19 having an air space 21 between the sheet metal 18 and the metal 19. It will be understood that low temperature insulation such as fiber glass insulation may be provided at the innersurface of the outer surround sheet metal 19 when the preferred embodiment fireplace is to be employed in a zero clearance mode or application. The secondary air inlet 14 is connected to the vertical duct 22 which in turn is connected to the horizontal pipe or conduit 23. Conduit 23 is connected to the outlet manifold 16 which is preferably located below the restrictor plate 24 which also forms part of the heating exchanger used in the primary combustion air system. A primary air inlet duct 25 is shown extending through the outer shrouds and insulation and terminates in an open exhaust in the primary air heat exchanger shown generally at numeral 26.

Inlet duct 25 is preferably connected to a source of outside fresh air which passes through a control damper 27 having a control handle or knob 28 which passes through the frame 15 for enabling a plurality of predetermined burn rate settings to be easily achieved or set. Alternatively, it is possible to connect a damper 27 to a bimetallic spring 29 which senses the heat of duct 25 in the exhaust outlet of the combustion chamber and is capable of maintaining the proper amount of primary combustion air flowing through inlet duct 25. It will be understood that the preferred embodiment system employs the manual control damper 27 for the highest degree of efficiency. Outside fresh air is conducted through inlet duct 25 is passed into the heat exchanger 26 where it must pass through a pair of perforated baffles 31 which defuse the air and distribute it uniformly across the front of the heat exchanger so that it is uniformly exhausted from the outlet grill 13 across the face of the glass in the glass doors 11. The exhaust stack 32 is shown in phantom lines in FIG. 2 as an 8" exhaust stack. When a smaller dimension stack such as 4", 5" and 6" is employed, it is not necessary to employ the restrictor plate 24 to slow down the velocity of the exhaust gases from the combustion chamber. It will be understood that slowing down the exhaust gases from the combustion chamber enables the fireplace 10 to maintain a higher pyrolytic temperature at the refractory wall surfaces 12 at the expense of lowering the burn rate of fuel in the combustion chamber. However, the efficiency of the present system has been shown to exceed 70%. A normal wood burning stove may have a thermal efficiency of only 40%, thus, a normal standard wood is rated at 7500 BTUs per pound when burned at 15 pounds per hour is capable of producing only 45,000 BTUs per hour maximum at a 40% efficiency rate. In contrast thereto, the present embodiment clean burning fireplace when burned at 70% efficiency can burn eight pounds of wood per hour and produce 42,000 BTUs per hour or about half the burning rate of the inefficient fireplace.

It will be understood that both the present invention and the prior art inefficient wood burning stoves will burn wood at the hottest part of the flames at approximately 1250° Fahrenheit. However, by efficiently heating the refractory material at the sides, back and bottom of the combustion chamber it is possible to supply secondary combustion air to these areas and achieve temperatures consistently at 1250° to 1400° at various burn rates. Not only is the high pyrolytic temperature maintained to burn all of the gas, oil and tars from burning wood but it is possible with the present clean burning fireplace to maintain a glass temperature at or below 750° Fahrenheit while maintaining a stack temperature of as low as 240° F. at low burning rates and not exceeding 500° F. at higher burning rates. The desired results are achieved by having an efficient air wash over the glass in the doors 11 and preheating the primary air to the heat exchanger 26 and preheating the secondary combustion air in a novel duct and heat exchanger system to be explained in greater detail hereinafter.

Figure 3:
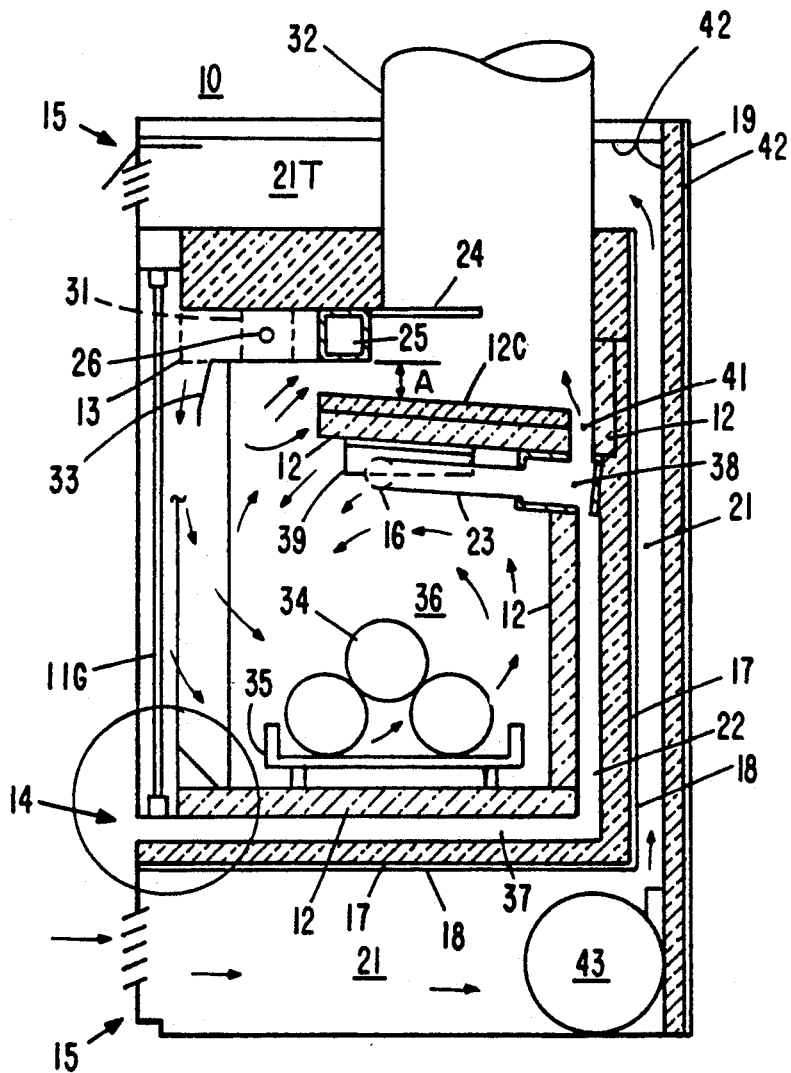
FIG. 3 is a sectional side view of the fireplace of FIG. 1 showing the preferred location of the primary and secondary air heat exchange supply systems.

Refer now to FIG. 3 showing a side view in section of the fireplace of FIG. 1 and showing the preferred location of the primary and the secondary air heat exchanger supply systems. The aforementioned inlet duct 25 forms the fresh air inlet into the plenum shaped heat exchanger 26 which is provided with diffusion baffles 31 and terminates at the outlet grill 13 so as to supply fresh preheated primary combustion air which passes deflector 33 and form an air wash along the inside of the glass 11G of glass doors 11 which further preheats the combustion air before it enters the lower portion of the combustion chamber shown having logs 34 supported on a grate 35. The preheated combustion air flows under and through the grate 35 so as to burn the logs 34 and produce products of combustion at the center of the combustion chamber 36. Secondary combustion air is preferably supplied at the inlet 14 and proceeds through horizontal duct 37 to a vertical duct 22 and enters a transverse secondary combustion air manifold 38 and is passed into conduit 23 and exits through outlet manifold 16 as secondary combustion air. The secondary combustion air exits from the transverse manifold 38 and is directed downward along an exit path from the outlet manifold 16 as shown by the directional arrow. This downward directed air from manifold 16 causes a swirling action as do the apertures in the transverse manifold 38 creating a turbulent mixing effect with the secondary combustion air and the products of combustion mentioned hereinbefore. This supply of secondary combustion air is sufficient to elevate the temperatures of the refractory panels 12 to a higher temperature than the flame temperature of the burning logs alone. It has been found that the outlet manifold 16 and its conduit 23 glow at a cherry red temperature indicating a temperature in excess of 1200°. Temperature probes applied to the surface of the rigid refractory panels 12 indicate temperatures as high as 1400° while maintaining burning rates as low as two pounds of wood per hour. This exceedingly high temperature in the upper portion of the combustion chamber creates a pyrolytic temperature condition which completely consumes all of the volatile material before it is swirled and exhausted through the narrow exhaust passageway shown at point A representing the distance between the upper refractory panel 12 of the combustion chamber 36 shown having a ceramic insulation layer 12C on the top thereof. Thus, the combustion gases are swirling and moving to the exit of the combustion chamber are directed along the lower surface of the inlet duct 25 and the lower panel of the heat exchanger 26 so as to preheat the primary combustion air before it is washed over the inner surface of the glass 11G. The hot glass further preheats this combustion air in the combustion chamber 36.

Since the temperatures in the combustion chamber 36 are raised to the pyrolytic level, it is desirable to manufacture the outlet manifold 16, conduit 23 and transverse manifold 38 from high temperature stainless steel because they serve the function of an auxiliary igniter in the combustion chamber when sufficient secondary combustion air is supplied thereto.

The panel 12 above the manifold 16, 38 and conduit 23 is supported in place by a pair of adjustable brackets 39 which permit the adjustment of the height of the exit path shown at A. This adjustment is set at the factory for the highest efficiency at the highest burning rate expected knowing that the lower efficiency at the lower burning rate is not as important as the efficiency of the higher burning rate. However, the efficiency at both the higher and the lower burning rate are substantially higher than known prior art fireplaces for burning solid fuels. As an optional feature, it is possible to provide a small aperture 41 connected to the transverse manifold 38 so as to supply secondary combustion air into the lower portion of the stack 32. This secondary combustion air is preferably supplied to cool the stack 32 but may also serve the function of supplying tertiary combustion air to any of the products of combustion which are not completely consumed in the combustion chamber which may occur at very high burning rates. Thus, the desirability of the tertiary combustion air serves two purposes. To cool the stack 32 at higher burning rates and to consume any volatiles which may be swept past the top panel at area A at higher burning rates.

In the preferred embodiment of the present invention, the fireplace 10 may be employed in a zero clearance mode wherein the fireplace 10 is usually installed abutting an outside wall of the room or residence in which it is installed. The outer surround sheet metal 19 is shown having a fiber glass insulation layer 42 connected to the innersurface of the outer surround 19. The sheet metal surround 18 which is at the rear surface of the flexible ceramic wool insulation reaches temperatures approximating 350° F. plus or minus 50° F. in its preferred mode of operation. Room air which enters into the bottom area shown as plenum 21 is conducted along the vertical passageway or plenum 21 and passes around the stack 32 into the top plenum 21T and is exited again into the room as convection heated air. This heat exchanger keeps the outer surround 19 cool to the touch and also provides a highly efficient heat exchanger. Since the products of combustion in the combustion chamber 36 elevate the refractory insulation material 12 to pyrolytic temperatures, a great amount of radiant heat is transmitted through the glass 11G, thus heating remote areas of a room with radiant heat in the infrared spectrum. Further, the blower motor 43 pulls enough air from the room across the outer surface of the glass 11G to preheat some of the room air before entering the lower plenum 21. Since the glass 11G reaches temperatures as high as 750° Fahrenheit, it is desirable to provide a protective screen to prevent the occupants in the room from inadvertently touching the hot glass 11G. When such protective screen is provided, there is no hot surface left to be touched inadvertently as occurs when wood burning stoves are used.

Figure 4:
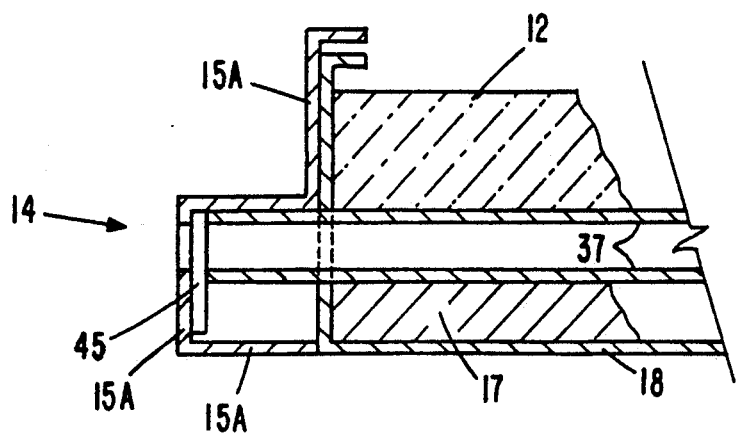
FIG. 4 is an enlarged view of the encircled area of FIG. 1 showing the preferred intake of the secondary air supply system of FIG. 4.

Refer now to FIG. 4 showing an enlarged view of the encircled area of FIG. 3 showing the preferred intake for the secondary air supply system. The inlet 14 also shown in FIGS. 1 and 3 is provided as an aperture in a cross-member 15A of the frame 15. The duct 37 is shown abutting and matching the inlet 14 from the reverse side and passes under the hot rigid refractory member 12 in the bottom of the combustion chamber 36. Thus, the hot refractory panel 12 transmits heat into the duct 37 which is insulated below by the flexible ceramic wool insulation panel 17 across the bottom and at the sides (not shown). It will be understood that the duct 37 connects to a vertical duct 22 which is also abutted against the vertical refractory panel 12 as shown in FIG. 3 and forms an extension of the heat exchanger for preheating the secondary combustion air which is supplied to the transverse manifold 38. It will be appreciated that the transverse manifold 38 conduit 23 and outlet manifold 16 also preheat the secondary air which exits through apertures which will be described in greater detail hereinafter.

Figure 5:
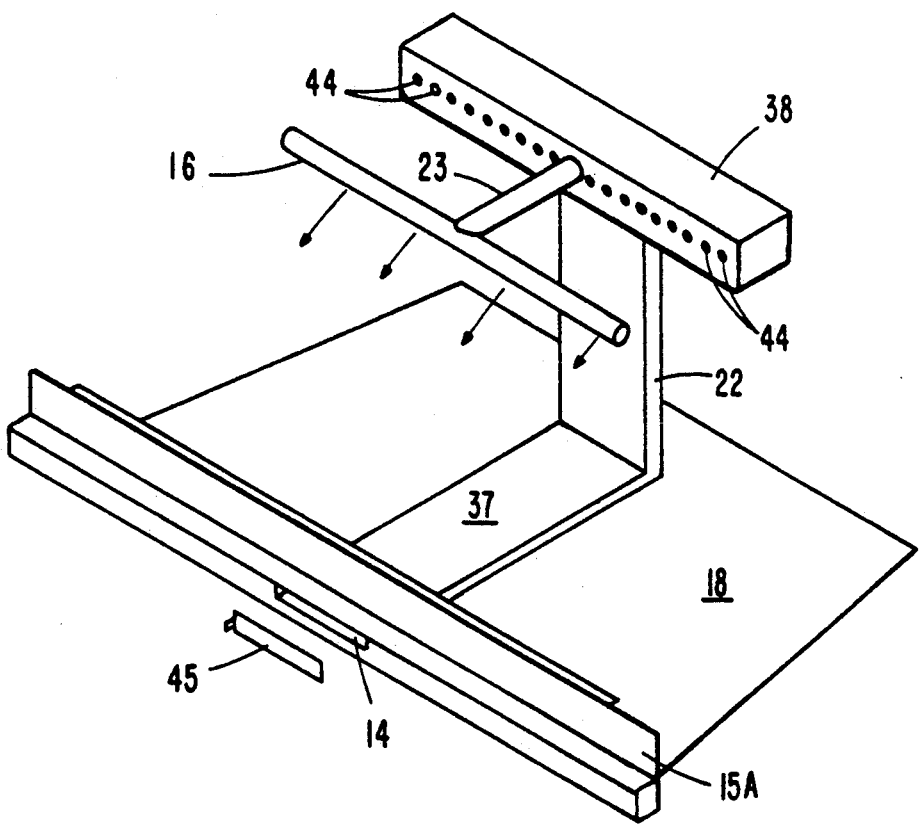
FIG. 5 is an isometric view of the preferred embodiment novel secondary air supply system.

Refer now to FIG. 5 showing an isometric view of the preferred embodiment novel secondary air supply system which comprises a heat exchanger having a horizontal duct 37 and a vertical duct 22 which connects to a transverse manifold 38 which extends into the combustion chamber 36 and is provided with apertures 44 which supply secondary combustion air directly into the combustion chamber 36. It will be appreciated that the direction of flow of the secondary combustion air from apertures 44 may be directed substantially horizontal or partially downward or may be a combination of both at alternate apertures 44. In the preferred embodiment of the present invention no apertures are provided in the conduit 23 but a complete row of downward directed apertures (not shown) are provided in the manifold 16. It is possible to continue the conduit 23 from the manifold 38 and provide a secondary outlet manifold 16 which directs its secondary combustion air substantially downward into the combustion chamber so as to create a swirl and turbulent effect in the combustion chamber 36. Initial test date indicates that this has not been necessary. Further, a slide plate 45 has been provided behind the inlet 14 to control the amount of secondary combustion air and is shown in greater and better detail in FIG. 4. This slide plate is preferably adjusted at the factory and does not require further adjustment of the system when the adjustable control damper 27 shown in FIG. 2 is provided.

While the heat exchanger and secondary air supply system shown in FIG. 5 is the preferred embodiment, it will be recognized that it is employing room air for combustion, thus creates a condition which may generate a negative pressure in a room and cause outside air to enter through cracks in the room or house. If a source of outside combustion preheated air is not already available, such as does occur in condominiums and high rise apartments through the halls and air supply systems, it may be desirable to connect the transverse manifold 38 directly to a source of outside air.

Figure 6:
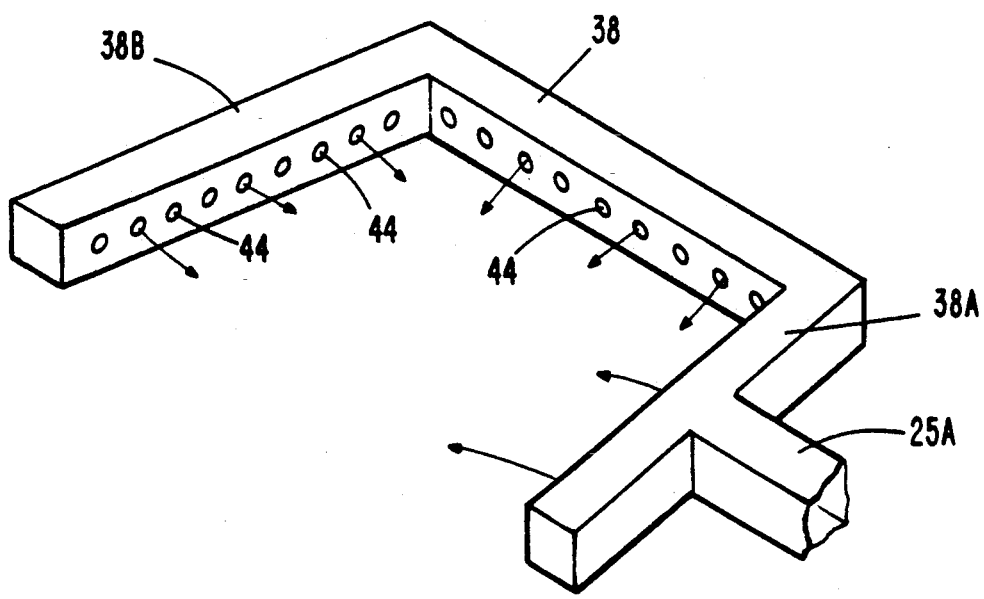
FIG. 6 is an isometric view of a modified or alternative secondary air supply system.

Refer now to FIG. 6 showing an isometric view of a modified or alternative secondary air supply system which may be connected directly to a source of outside air or connected to the same inlet duct system as the primary combustion air duct 25. While it is possible to use the previously described air system comprising the transverse duct 38, the conduit 23 and the outlet manifold 16, it is also possible to connect a duct 25A directly to a manifold 38A which is connected to the transverse manifold 38 which is connected to an extension manifold 38B, all of which are supplied with apertures 44 which direct air downward and across the combustion chamber 36 so as to create a desirable turbulent action which enhances complete combustion of the products of combustion in the combustion chamber 36 before exiting into the exhaust stack 32.

Having explained a preferred embodiment of the present invention, it will be appreciated that the EPA specifies four burn rate categories wherein Category 1 has a range from 0 up to 1.76 pounds per hour and Category 2 has a burn rate from 1.76 to 2.75 pounds per hour. Category 3 starts at 2.75 pounds per hour and goes up to 4.2 pounds per hour and anything in excess of 4.2 pounds per hour is Category 4 which is the maximum burn rate of the unit being tested. Thus, it will be understood that the present embodiment clean burn furnace is designed to embrace all four categories and still maintain the efficiency and low particulate emission levels specified by the EPA.

Having explained a preferred embodiment and a modification thereof of the clean burn fireplace employing primary and second preheated air, it will be appreciated that no forced air or induced air is necessary in the primary and secondary combustion air systems. Further, it will be further appreciated that the primary and secondary air is introduced at the top of the combustion chamber and forced by directional orifices and deflectors to swirl into the combustion chamber and form a desired turbulent effect which heats the side walls and bottom and top panels of the combustion chamber to a temperature which approaches the hot flames of combustion from the solid fuel 34. It was found that when burning at a low rate of combustion that the amount of primary combustion air may be less than the amount of secondary combustion air and when burning at the highest combustion rates that the amount of primary air clearly exceeds the amount of secondary combustion air used. Thus, it will be appreciated that a manual control 27, 28 is a desirable feature which can not be completely automated without using expensive sensors which require probes in the exhaust gases. Stated differently, having once set the primary air control 27, 28 the setting of the control sets the combustion rate regardless of the amount of fuel deposited in the combustion chamber. However, it must be understood that when a load of wood 34 is deposited in the combustion chamber 36 and the control 27, 28 set for a low burn rate that the wood will initially burn faster at the beginning and the burn rate continues to diminish and is stabilized at a diminishing logarithmic burn rate time function. As an example, an 18 pound load of wood will burn approximately half of its weight in the first hour and during the second hour will burn approximately one-half of the remaining wood and during the third hour will burn approximately one-half of the then remaining wood by the end of the third hour, etc., etc. even though the primary combustion air has been set for a burn rate of approximately 1.8 pounds per hour, which is the overall average rate for a complete consumption of the wood over a period of 10 hours. However, the same rate of burn setting will burn the wood at an average rate of about 3.0 pounds per hour for an average of five hours. Other burn rate settings are obtainable with controls 27,28. It will now be appreciated that the setting of the primary combustion air requires that the secondary combustion air vary itself so as to maintain the pyrolytic temperature in the combustion chamber while the primary combustion air maintains itself substantially constant at a preferred setting.

What is claimed is:

1. A clean burning pyrolytic temperature fireplace for burning solid fuels, comprising:
   a solid fuel fireplace having a transparent glass sidewall for viewing solid fuel being burned,
   said fireplace having a central combustion chamber comprising high temperature bottom, side and back refractory walls for retaining combustion temperatures in excess of 1100° Fahrenheit,
   a primary combustion air heat exchanger mounted in the top of said combustion chamber in the exhaust gas path from said combustion chamber,
   said primary combustion air heat exchanger comprising a plenum shaped area having a primary air inlet for connection to a source of primary air and an outlet grill connected thereto for discharging preheated primary combustion air downward across the inside surface of said transparent glass sidewall and into the bottom of said combustion chamber,
   a secondary combustion air heat exchanger also mounted in the top of said combustion chamber in said exhaust gas path, said secondary combustion air heat exchanger comprising an outlet manifold and a secondary air inlet at a front of said fireplace below said transparent glass sidewall for connection to a source of secondary air, a horizontal and vertical duct behind said refractory walls for connecting said inlet to said outlet manifold, and said outlet manifold being located in said combustion chamber for discharging preheated secondary air across the top of said combustion chamber, whereby incompletely burned solid fuel products of combustion are further oxidized at pyrolytic temperatures at said refractory walls while maintaining the inside surface of said transparent glass sidewall at a temperature below 750° Fahrenheit while achieving high efficiency burn rates at different rates of combustion.

2. A clean burning fireplace as set forth in claim 1 which further included a refractory panel in the top of said combustion chamber and wherein said secondary combustion air is always sufficient to maintain said top panel and side refractory walls of said combustion chamber between 1100° to 1400° Fahrenheit.

3. A clean burning fireplace as set forth in claim 2 which further includes means for controlling said secondary combustion air to exceed the amount of primary combustion air at low burning rates.

4. A clean burning fireplace as set forth in claim 2 which further includes means for controlling said primary combustion air to exceed the amount of secondary combustion air at high burning rates.

5. A clean burning fireplace as set forth in claim 4 wherein said means for controlling includes control means coupled to said primary air inlet of said heat exchanger for controlling the amount of primary combustion air for said different rates of combustion.

6. A clean burning fireplace as set forth in claim 5 wherein said control means comprises a manual controlled damper in said primary air inlet.

7. A clean burning fireplace as set forth in claim 5 wherein said control means comprises a bimetallic element connected to said damper in said primary air inlet.

8. A clean burning fireplace as set forth in claim 1 wherein said primary combustion air heat exchanger comprises a plenum between said primary air inlet and said outlet grill and further includes a plurality of baffles therein.

9. A clean burning fireplace as set forth in claim 1 wherein said second combustion air heat exchanger comprises a plurality of outlet manifolds having apertures therein which discharge secondary combustion air across the top of said combustion chamber.

10. A clean burning fireplace as set forth in claim 1 wherein said primary combustion air heat exchanger outlet grill and said secondary combustion air outlet manifold are provided with apertures directed to swirl the combustion air in the same swirling direction.

11. A clean burning fireplace as set forth in claim 9 wherein said manifolds of said secondary combustion air heat exchanger are parallel to each other and each further comprises apertures for supplying secondary combustion air across the top of said combustion chamber at a direction which is pointed downward and substantially orthogonal to the direction of said primary combustion air to enhance the turbulent and swirling effect of combustion gases.

12. A clean burning pyrolytic temperature fireplace for burning solid fuels, comprising:

a solid fuel fireplace having a transparent glass sidewall for viewing solid fuel being burned, said fireplace having a central combustion chamber comprising high temperature bottom, side and back refractory walls for retaining combustion temperatures in excess of 1100° Fahrenheit, a primary combustion air heat exchanger mounted in the top of said combustion chamber in the exhaust gas path from said combustion chamber, said primary combustion air heat exchanger comprising a primary air inlet for connection to a source of primary air and an outlet grill connected thereto for discharging preheated primary combustion air downward across the inside surface of said transparent glass sidewall and into the bottom of said combustion chamber, a secondary combustion air heat exchanger comprising a transverse outlet manifold mounted in the top of said combustion chamber in said exhaust gas path, said secondary combustion air heat exchanger further comprising a secondary air inlet at the front of said fireplace for connection to a source of secondary air and connected through a horizontal and a vertical duct behind said refractory walls to said transverse outlet manifold for discharging preheated secondary air across the top of said combustion chamber, whereby incompletely burned solid fuel products of combustion are further oxidized at pyrolytic temperatures of said refractory walls while maintaining the inside surface of said transparent glass sidewall at a temperature below 750° Fahrenheit while achieving high efficiency burn rates at different rates of combustion.

13. A clean burning fireplace as set forth in claim 1 which further includes a top panel comprising a refractory panel element located above said secondary air heat exchanger and below said primary air heat exchanger for forming a narrow escape outlet area therebetween for exhaust gases.

14. A clean burning fireplace as set forth in claim 13 which further includes a layer of high temperature insulation surrounding the back of said refractory bottom, side and back walls and the top of said combustion chamber.

15. A clean burning fireplace as set forth in claim 14 which further includes a layer of insulation inside of the back wall of said fireplace spaced apart from said high temperature insulation, whereby said back wall is sufficiently cooled to be placed against a building wall for a zero clearance installation.

16. A clean burning pyrolytic temperature fireplace for burning solid fuels, comprising:

a solid fuel fireplace having a transparent glass sidewall for viewing solid fuel being burned, said fireplace having a central combustion chamber comprising high temperature bottom, side and back refractory walls for retaining combustion temperature in excess of 1100° Fahrenheit, a primary combustion air heat exchanger mounted in the top of said combustion chamber in the exhaust gas path from said combustion chamber, said primary combustion air heat exchanger comprising a primary air inlet for connection to a source of primary air and an outlet grill connected thereto for discharging preheated primary combustion air downward across the inside surface of said transparent glass sidewall and into the bottom of said combustion chamber, a secondary combustion air heat exchanger also mounted in the top of said combustion chamber in said exhaust gas path, a top panel having a refractory panel element located above said secondary combustion air heat exchanger and below said primary air heat exchanger and forming a narrow escape outlet area therebetween for exhaust gases which are directed into an exhaust stack of said fireplace, support means for supporting said top panel and for adjusting the height of said top panel and the outlet area for said exhaust gases to said exhaust stack, said secondary combustion air heat exchanger comprising a secondary air inlet for connection to a source of secondary air and an outlet manifold for discharging preheated secondary air across the top of said combustion chamber, whereby incompletely burned solid fuel products of combustion are further oxidized at pyrolytic temperatures at said refractory walls while maintaining the inside surface of said transparent glass sidewall at a temperature below 750° Fahrenheit while achieving high efficiency burn rates at different rates of combustion.

17. A clean burning fireplace as set forth in claim 16 which further includes a layer of high temperature insulation surrounding the back of said refractory bottom side and back walls and the top of said combustion chamber.

18. A clean burning fireplace as set forth in claim 17 which further includes a layer of insulation inside of the back wall of said fireplace spaced apart from said high temperature insulation, whereby said back wall is sufficiently cooled to be placed against a building wall for a zero clearance installation.

19. A clean burning fireplace as set forth in claim 1 which further includes a layer of high temperature insulation surrounding the back of said refractory bottom side and back walls and the top of said combustion chamber.

* * * * *